Patented May 17, 1938

2,117,572

UNITED STATES PATENT OFFICE 2,117,572

METHOD OF REFINING ROSIN AND ROSIN ESTERS

Lanning Parke Rankin, Lawrence, Kans., assignor to Hercules Powder Company, Wilmington, Del., a corporation of Delaware No Drawing. Application April 25, 1936, Serial No. 76,393

16 Claims. (Cl. 87—2)

This invention relates to an improved method of refining rosin and rosin esters and more particularly to an improved method for removing color bodies from low-grade rosin and from esters of low-grade rosin.

As is well known, both unrefined wood and low-grade gum rosins contain both visible and latent color bodies which render the rosin undesirable for use in connection with the production of various products where a light color is desired. Heretofore, it has been known to refine rosin and rosin esters by treatment with a selective solvent for the visible and latent color bodies contained in the rosin or rosin ester, and a wide variety of suitable selective solvents have been found for the purpose. Thus, rosin has been dissolved in a suitable solvent therefore, and the solution so formed treated with an immiscible selective solvent for the color bodies. After this treatment, the rosin solution is separated from the selective solvent and the color bodies and dark rosin dissolved therein, and a light colored rosin recovered by the evaporation of the solvent from the rosin solution. Gasoline has been found to be a suitable solvent for this refining treatment and has been widely used for the purpose.

The object of this invention is to provide an improved method for refining rosin and rosin esters by treatment with the various selective color body solvents known to the art, whereby a paler rosin can be produced in a given yield, than has been produced heretofore, or, if desired, a higher yield obtained for a given improvement in color.

Now, in accordance with my invention, I provide a method for refining rosin, whereby a rosin or a rosin ester is subjected to the solvent action of a normally gaseous hydrocarbon or hydrocarbon mixture under conditions of temperature and pressure such that the gaseous hydrocarbon is held substantially in the liquid phase and to the solvent action of a selective color body solvent capable of immiscibility with the hydrocarbon, and the solution of the refined rosin or rosin ester in the hydrocarbon or hydrocarbon mixture separated from the solution of color bodies in the selective solvent. Refined rosin or rosin esters may be recovered from the hydrocarbon solution by the evaporation of the hydrocarbon solvent. The color bodies and dark rosin or dark rosin ester may be recovered from the selective solvent solution by the evaporation of the selective solvent.

By the use of a normally gaseous hydrocarbon held in the liquid phase, as a solvent in the selective solvent refining of rosin or a rosin ester, I secure more efficient refining with a given selective solvent than has been secured heretofore. The reason for this appears to be that such hydrocarbons are less active solvents for the visible and latent color bodies of rosin or rosin esters, than the higher boiling hydrocarbons contained in petroleum ether and gasoline, so that selective solvents extract the color bodies from rosin solutions in normally gaseous hydrocarbons by the method in accordance with this invention, more efficiently than from rosin solutions in petroleum ether or gasoline by the methods of the prior art. A further advantage in the use of gaseous hydrocarbons in accordance with this invention is completeness and ease with which the hydrocarbon solvent may be removed from the rosin after the refining operation.

Any grade of wood or gum rosin containing visible and/or latent color bodies may be refined by the method in accordance with this invention. Likewise, esters of such rosins containing visible and/or latent color bodies, with either monohydric or polyhydric alcohols may be so refined. Thus, esters of rosin with monohydric alcohols, such as, for example, methanol, ethanol, propanol, butanol, amyl alcohol, cetyl alcohol, lauryl alcohol, stearyl alcohol, furfuryl alcohol, hydrofurfuryl alcohol, abietanol, hydroabietanol, phenol, benzyl alcohol, etc., or with polyhydric alcohols, such as, for example, ethylene glycol, diethylene glycol, triethylene glycol, glycerol, sorbitol, mannitol, erythritol, pentaerythritol, etc., may be refined by my new method.

The normally gaseous hydrocarbons which I may use as solvents in the refining treatment in accordance with this invention are saturated and olefinic hydrocarbons containing two, three, and four carbon atoms, or mixtures thereof, such as, for example, ethane, propane, butane, isobutane, ethylene, propylene, butylene, isobutylene, and mixtures thereof. In general, I prefer to use the saturated hydrocarbons, propane, butane, isobutane or mixtures thereof.

The selective solvent for visible and latent color bodies of rosin or of a rosin ester, which I use in accordance with this invention may be any of the various selective solvents for the color bodies of rosin or of rosin esters used heretofore, which are immiscible or substantially immiscible with the hydrocarbon solvent. Thus, I may use furfural, furfuryl alcohol, a substantially immiscible chlorohydrin, as, ethylene chlorohydrin, propylene chlorohydrin, etc., aniline, phenol, resorcinol, ethylene glycol, propylene glycol, butylene glycol, diethylene glycol, trimethylene glycol, glycerol, butyl glycerol, ethyl formate, methyl acetate, methyl formate, methyl orthonitrobenzoate, methyl furoate, allyl formate, monoacetin, diacetin, triacetin, ethylene glycol monoacetate, methanol, a hydroxyl alkyl amine, as triethanolamine, a solution of oxalic acid in water or in methanol, ethanol or other lower aliphatic alcohol, ethylene glycol monoethyl ether, or other immiscible glycol ether, ethylene glycol monoacetate, or other immiscible glycol ester, methyl thiocyanate, ethyl thiocyanate, acetonitrile, acetic acid, acetic anhydride, p-chloroaniline, resorcinol plus hydrosulphite, a boron compound, ethylene glycol diacetate, glycerol diacetate, resorcinol monoacetate, resorcinol diacetate phenyl acetate, furfuryl acetate, ethylidine diacetate, n-propyl furoate, ethyl glycollate, methyl citrate, ethyl tartrate, ethyl malonate, methyl maleate, dimethyl phthalate, benzyl formate, monobutyrin, ethyl carbonate, methyl lactate, diethyl oxalate, methyl adipate, hydroxyhydroquinone triacetate, methyl chlorocarbonate, propylene glycol monoacetate, hydroquinone diacetate, catechol monoacetate, guaiacyl acetate, methyl glutarate, ethyl oxalate, benzyl acetate, diethyl glutacoate, ethyl lactate, diethyl phthalate, ethyl anisate, methyl salicylate, methyl cinnamate, methyl mandelate, methyl acrylate, ethyl oxamate, methyl succinate, ethyl propiolate, methyl acrylate, ethyl malate, methoxybenzaldehyde, guaiacol, anisidin, nitroanisol, dichloroethyl ether, methoxy acetic acid, methyoxybenzyl alcohol, liquid sulfur dioxide, solutions of amphoteric metallic halides, nitromethane, mixtures of such refining agents which are chemically non-reactive, etc.

In carrying the method out in accordance with this invention, the rosin or rosin ester to be refined is dissolved in a normally gaseous hydrocarbon under a pressure and temperature such that the gaseous hydrocarbon is maintained substantially in the liquid phase, and treated with a selective solvent for the latent and/or visible color bodies of the rosin or rosin ester, having a capacity for substantially immiscibility with the hydrocarbon solvent, for example, by agitation of the selective solvent with the rosin solution. Alternately, the rosin or rosin ester per se, if normally a solid preferably in powdered form, is treated with a mixture of the normally gaseous hydrocarbon and the selective solvent capable of immiscibility therewith, under pressure and temperature such that the normally gaseous hydrocarbon is maintained substantially in the liquid phase. The pressure required to maintain the hydrocarbon in the liquid phase will depend upon the particular hydrocarbon chosen, and upon the temperature. Thus, for example, when carrying out the process at a temperature of 70° F., a pressure of 22 lbs. per sq. in. is necessary to keep butane in the liquid phase, while a pressure of 115 lbs. per sq. in. is necessary to keep propane in the liquid phase. Again, the rosin or rosin ester may be dissolved in a selective solvent capable of substantial immiscibility with a normally gaseous hydrocarbon held in liquid phase, and refined rosin or rosin ester extracted therefrom by treatment of this solution with a normally gaseous hydrocarbon under a pressure and a temperature such that it is maintained substantially in the liquid phase.

The temperature at which this refining procedure is carried out, may be any temperature below the critical temperature of the normally gaseous hydrocarbon and below a temperature at which substantial decomposition of the rosin occurs. In general it will be found advantageous to operate at normal room temperatures or below. The use of temperatures below room temperature is preferred since cooling renders the hydrocarbon phase more immiscible with the selective solvent phase. When desired, refrigeration can be applied by external cooling, or by permitting a small amount of the hydrocarbon to evaporate.

The method in accordance with this invention may be carried out in a batch or in a continuous process. In operating a continuous process, the hydrocarbon phase and the selective solvent phase may be contacted in concurrent or in countercurrent flow as may be desired.

As an illustration of the practical adaptation of the method in accordance with this invention, I may cite the following experimental procedure: Rosin and a selective solvent are placed in a stainless steel alloy pressure tube, cooling the tube until it is well below the boiling point of the hydrocarbon solvent to be used as a solvent, and then adding the hydrocarbon in liquid form to the tube. The tube is then sealed, warmed to room temperature and then agitated in a mechanical shaker until equilibrium of phases has been attained, say for a period of about an hour. The tube is then supported in a vertical position and the two phases allowed to separate, after which they are slowly valved out of the pressure tube, separation of the layers being made by observing the color and action of the escaping material and changing receivers when all of one phase has been drained off. The rosin from each phase is then recovered by evaporating off the solvent and removing the last traces under vacuum.

The details of a series of examples in which the foregoing procedure was used to refine FF grade wood rosin, using furfural as a selective solvent, and the properties of the products produced thereby, are given in Table I, in comparison with an example following prior art procedure in which FF wood rosin was refined with furfural as a selective solvent, and a liquid petroleum fraction (V. M. & P. Naphtha) as a rosin solvent, and the properties of the products produced thereby.

Table I

| Example No. | 1 | 2 | 3 | 4 | Prior art |
|---|---|---|---|---|---|
| Solvent used for rosin | Butane | Butane | Butane | Propane | V. M. & P. naphtha |
| Volume of solvent used in cc | 250 | 350 | 250 | 250 | 250 |
| Grams of FF grade wood rosin used | 37.5 | 23.3 | 25 | 37.5 | 37.5 |
| Grams of furfural used | 50.0 | 31.1 | 20 | 50 | 50 |
| Color of refined rosin produced (Lovibond rating) | 80A+2R | 80+3R | 80A+6½R | 80A+½R | 80A+9R |
| Yield of refined rosin | 55.3% | 69.2% | 72.8% | 23.5% | 73.1% |
| Yield of dark rosin from furfural phase | 42.9% | 25.3% | 22.4% | 73.6% | 25.6% |

In Table I it will be observed that the refined rosin produced in accordance with the procedure of this invention is of substantially better color than that produced by the prior art procedure. If desired, the solution of rosin in the normally gaseous hydrocarbon may be given several successive treatments with the selective solvent. For use of successive treatments the procedure described above is followed, except that after the phases are allowed to separate, the pressure tube is cooled below the boiling point of the hydrocarbon solvent and only the selective solvent layer is allowed to drain from the pressure tube and a fresh lot of furfural added and the mixture agitated in a mechanical shaker until equilibrium is attained, the tube supported in a vertical position and the two phases allowed to separate. The refined rosin and the dark rosin from the selective solvent layer may then be recovered as described above, or the procedure repeated for further treatments with fresh lots of the selective solvents.

The details of a series of examples in which the foregoing procedure was used to refine FF grade wood rosin, using three successive treatments with furfural as a selective solvent, and the properties of the products produced thereby are given in Table II in comparison with a similar treatment of three successive treatments following prior art procedure, in which FF grade wood rosin was refined with furfural as a selective solvent and a liquid petroleum fraction (V. M. & P. naphtha) as a rosin solvent, and the properties of the products produced thereby.

*Table II*

| Example No. | 5 | 6 | Prior art |
| --- | --- | --- | --- |
| Solvent used for rosin | Butane | Butane | V. M. & P. naphtha. |
| Volume of solvent used in cc | 250 | 250 | 250 |
| Grams of FF grade wood rosin used | 37.5 | 25 | 37.5 |
| Grams of furfural used | 50 | 20 | 50 |
| Color of refined rosin produced (Lovibond rating) | 27A | 45A | 75A |
| Yield of refined rosin | 23.2% | 43.2% | 49.3% |
| Yield of dark rosin from furfural phase | 76.8% | 53.2% | 49.1% |

It will be understood that the above examples are given by way of illustration only, and that the scope of my invention as herein broadly described and claimed is in no way limited thereby.

What I claim and desire to protect by Letters Patent is:

1. The method of refining a material from the group comprising rosin and rosin esters by the removal of color bodies therefrom, which comprises subjecting the material to the solvent action of a normally gaseous hydrocarbon under conditions of temperature and pressure such that the said hydrocarbon is maintained substantially in the liquid phase and to the solvent action of an appreciably immiscible liquid having a capacity for selectively dissolving color bodies therefrom, and separating the solution of refined material in the normally gaseous hydrocarbon phase and the solution of color bodies in the selective solvent phase.

2. The method of refining a material from the group consisting of rosin and rosin esters by the removal of color bodies therefrom which includes subjecting the material in solution in a normally gaseous hydrocarbon under conditions of temperature and pressure such that the said hydrocarbon is maintained substantially in the liquid phase, to treatment with a liquid having a capacity for selectively dissolving color bodies in the material and which is capable of immiscibility with the solvent for the material, and separating the selective solvent phase and the color bodies dissolved thereby from the hydrocarbon solution phase.

3. The method of refining a material from the group consisting of rosin and rosin esters by the removal of color bodies therefrom which includes subjecting the material in solution in a hydrocarbon having a boiling point below about 30° C. under conditions of temperature and pressure such that the said hydrocarbon is maintained substantially in the liquid phase, to treatment with a liquid having a capacity for selectively dissolving color bodies in the material and which is capable of immiscibility with the hydrocarbon and separating the selective solvent phase and the color bodies dissolved thereby from the hydrocarbon solution phase.

4. The method of refining a material from the group consisting of rosin and rosin esters by the removal of color bodies therefrom which includes subjecting rosin in solution in a normally gaseous aliphatic hydrocarbon under conditions of temperature and pressure such that the said hydrocarbon is maintained substantially in the liquid phase, to treatment with a liquid having a capacity for selectively dissolving color bodies in the material and which is capable of immiscibility with the hydrocarbon and separating the selective solvent phase and the color bodies dissolved thereby from the hydrocarbon solution phase.

5. The method of refining a material from the group consisting of rosin and rosin esters by the removal of color bodies therefrom which includes subjecting the material in solution in butane under conditions of temperature and pressure such that the said hydrocarbon is maintained substantially in the liquid phase, to treatment with a liquid having a capacity for selectively dissolving color bodies in the material and which is capable of immiscibility with the hydrocarbon and separating the selective solvent phase and the color bodies dissolved thereby from the hydrocarbon solution phase.

6. The method of refining a material from the group consisting of rosin and rosin esters by the removal of color bodies therefrom which includes subjecting the material in solution in isobutane under conditions of temperature and pressure such that the said hydrocarbon is maintained substantially in the liquid phase, to treatment with a liquid having a capacity for selectively dissolving color bodies in the material and which is capable of immiscibility with the hydrocarbon and separating the selective solvent phase and the color bodies dissolved thereby from the hydrocarbon solution phase.

7. The method of refining a material from the group consisting of rosin and rosin esters, by the removal of color bodies therefrom which includes subjecting the material in solution in propane under conditions of temperature and pressure such that the said hydrocarbon is maintained substantially in the liquid phase, to treatment with a liquid having a capacity for selectively dissolving color bodies in the material and which is capable of immiscibility with the hydrocarbon and separating the selective solvent phase and the color bodies dissolved thereby from the rosin solution phase.

8. The method of refining a material from the group consisting of rosin and rosin esters by the removal of color bodies therefrom which includes subjecting the material in solution in a normally gaseous hydrocarbon under conditions of temperature and pressure such that the said hydrocarbon is maintained substantially in the liquid phase, to treatment with furfural, and separating the furfural and the color bodies dissolved thereby from the hydrocarbon solution.

9. The method of refining a material from the group consisting of rosin and rosin esters by the removal of color bodies therefrom which includes subjecting the material in solution in a normally gaseous aliphatic hydrocarbon under conditions of temperature and pressure such that the said hydrocarbon is maintained substantially in the liquid phase, to treatment with furfural, and separating the furfural and the color bodies dissolved thereby from the hydrocarbon solution.

10. The method of refining a material from the group consisting of rosin and rosin esters by the removal of color-bodies therefrom which includes subjecting the material to the solvent action of butane under conditions of temperature and pressure such that the butane is maintained substantially in liquid phase, and to the solvent action of furfural, and separating the furfural and the color-bodies dissolved thereby from the butane solution.

11. The method of refining a material from the group consisting of rosin and rosin esters by the removal of color-bodies therefrom which includes subjecting the material to the solvent action of isobutane under conditions of temperature and pressure such that the isobutane is maintained substantially in liquid phase, and to the solvent action of furfural, and separating the furfural and the color-bodies dissolved thereby from the isobutane solution.

12. The method of refining a material from the group consisting of rosin and rosin esters by the removal of color-bodies therefrom which includes subjecting the material to the solvent action of propane under conditions of temperature and pressure such that the propane is maintained substantially in liquid phase, and to the solvent action of furfural, and separating the furfural and the color-bodies dissolved thereby from the propane solution.

13. The method of refining a material from the group consisting of rosin and rosin esters by the removal of color-bodies therefrom which includes subjecting the material to the solvent action of a normally gaseous aliphatic hydrocarbon under conditions of temperature and pressure such that the said hydrocarbon is maintained substantially in liquid phase, and to the solvent action of a phenol, and separating the phenol and the color bodies dissolved thereby from the hydrocarbon solution.

14. The method of refining a material from the group consisting of rosin and rosin esters by the removal of color-bodies therefrom which includes subjecting the material to the solvent action of a normally gaseous aliphatic hydrocarbon under conditions of temperature and pressure such that the said hydrocarbon is maintained substantially in liquid phase, and to the solvent action of phenol, and separating the phenol and the color-bodies dissolved thereby from the hydrocarbon solution.

15. The method of refining a material from the group consisting of rosin and rosin esters by the removal of color-bodies therefrom which includes subjecting the material to the solvent action of a normally gaseous aliphatic hydrocarbon under conditions of temperature and pressure such that the said hydrocarbon is maintained substantially in liquid phase, and to the solvent action of an alkyl thiocyanate, separating the alkyl thiocyanate and the color-bodies dissolved thereby from the hydrocarbon solution.

16. The method of refining a material from the group consisting of rosin and rosin esters by the removal of color-bodies therefrom which includes subjecting the material to the solvent action of a normally gaseous aliphatic hydrocarbon under conditions of temperature and pressure such that the said hydrocarbon is maintained substantially in liquid phase, and to the solvent action of a methyl thiocyanate, separating the methyl thiocyanate and the color-bodies dissolved thereby from the hydrocarbon solution.

LANNING PARKE RANKIN.